United States Patent [19]

Kishi et al.

[11] Patent Number: 5,424,729
[45] Date of Patent: Jun. 13, 1995

[54] FUNCTION SELECTING OPERATION PANEL

[75] Inventors: Kazuo Kishi, Kiyose; Tatsuya Tomitsuka; Kiyoshi Kitahara, both of Tokyo, all of Japan

[73] Assignee: Citizen Watch Co., Ltd., Tokyo, Japan

[21] Appl. No.: 114,277

[22] Filed: Sep. 1, 1993

[30] Foreign Application Priority Data

Sep. 7, 1992 [JP] Japan .................................. 4-262742

[51] Int. Cl.⁶ ....................... B41J 35/18; G09G 3/02; G02F 1/1333
[52] U.S. Cl. ....................................... 341/23; 341/28; 345/173
[58] Field of Search ................... 341/23, 28; 345/174, 345/173; 364/401, 405; 395/156, 157, 159, 118

[56] References Cited

U.S. PATENT DOCUMENTS

| | | | |
|---|---|---|---|
| 4,675,515 | 6/1987 | Lucero | 235/381 |
| 5,059,960 | 10/1991 | Rosenberg et al. | 341/23 |
| 5,216,411 | 6/1993 | Ashitomi et al. | 341/23 |

FOREIGN PATENT DOCUMENTS 3-244582  3/1991  Japan .............................. B41J 35/18

Primary Examiner—James J. Groody
Assistant Examiner—Glenton B. Burgess
Attorney, Agent, or Firm—Lowe, Price, LeBlanc & Becker

[57] ABSTRACT

An operational panel capable of expanding the number of function menus to be selected. The operation panel has a cover 8 which is formed with display window 7a to 7d and equipped with push buttons 10a to 10d, respectively, at the side of the display windows 7a to 7d. The operation panel cover 8 is arranged on its back with two slide sheets 3 and 4 which are superposed one on the other but allowed to slide independently of each other. In accordance with the sliding movements of the slide sheets 3 and 4, micro-switches are turn ON/OFF. The upper slide sheet 3, as located just behind the operational cover 8, is formed with both indicators for indicating the function names and transparent portions. These transparent portions are positioned to face all tile display window 7a to 7d of the operational panel cover 8, when the upper slide sheet 3 is in a predetermined slide position. On the other hand, the lower slide sheet 4 is formed with display portions for displaying the function names.

10 Claims, 13 Drawing Sheets

FIG.6(a)
FIG.6(b)
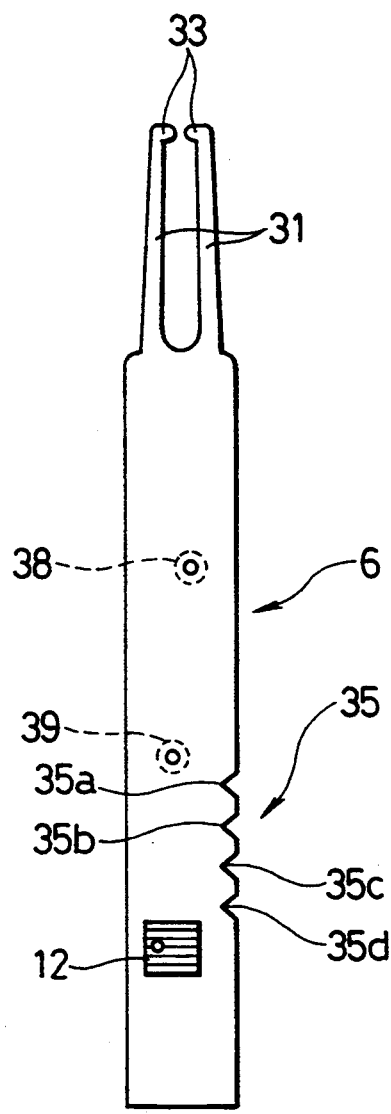
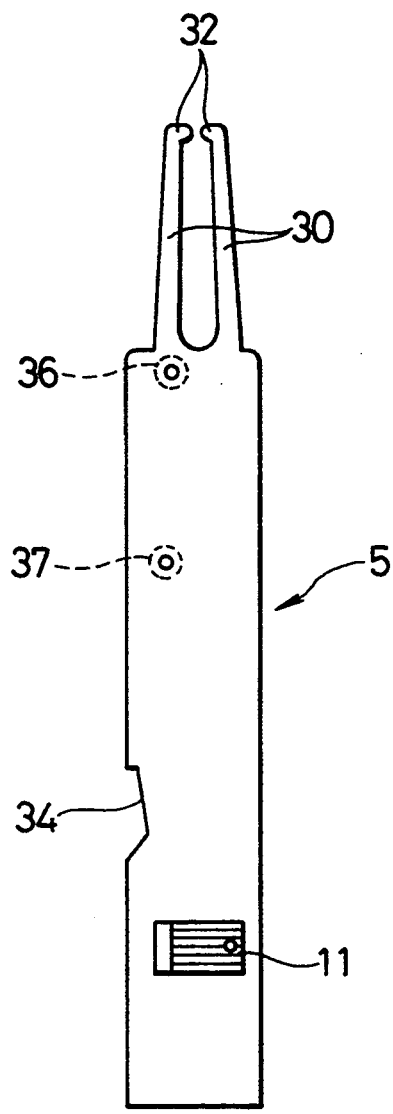

FUNCTION SELECTING OPERATION PANEL

BACKGROUND OF THE INVENTION

FIELD OF THE INVENTION

The present invention relates to an operation panel for selecting one of menus to set the operation modes or the like of an apparatus body such as a printer or a computer.

DESCRIPTION OF THE RELATED ART

As the means for selecting one of the menus to set the operation modes of the apparatus body, there has been proposed an operation panel which is intended to improve the controllability of the menu selection by constructing a display mechanism of a menu frame corresponding one to one to key switches on the operation panel.

For example, the operation panel, as disclosed in a color switching display system of a printer of Japanese Patent Laid-Open No. 244582/1991, is constructed to comprise: a slide switch for selecting the function menus of the printer; a slide display plate connected with the slide switch; a plurality of display windows formed in a panel body housing the slide display plate; a multiplicity of function keys having their input functions changing with the function displayed in any of the plural display windows; and a set of marks indicating the function menu selected on the panel body by the slide switch. When the slide switch for selecting the function menu of the printer is operated to match the function menu on the panel body, the slide display plate connected with the slide switch is moved to cause the function menu to appear in any of the plural display windows so that the function to be selected is designated by selecting and pushing any of the multiple function keys having their input functions changing with the function displayed.

If the function menu to be selected by the slide switch is enriched with that construction, the moving range of the slide switch has to be enlarged according to the increase in the display of the set of marks on the operation panel, so that the area of the operation panel has to be enlarged.

On the other hand, the printer or the like has to increase the number of function menus to be selected in the operation panel because there are many menus for setting the operation modes of the apparatus body.

SUMMARY OF THE INVENTION

It is, therefore, an object of the present invention to provide a function selecting operation panel which has a mechanism for displaying a menu display corresponding one to one to the push buttons on the operation panel and which can expand the number of function menus to be selected in the operation panel without any increase in its area.

According to an aspect of the present invention, there is provided a function selecting operation panel which comprises: a body having a plurality of push buttons for selecting a plurality of switches; an operation panel cover mounted on the body and having a plurality of function display windows and a plurality of push button apertures formed adjacent to the function display windows for selecting the function names appearing in the function display windows; a first operation member made slidably movable into a plurality of selected positions between the operation panel cover and the body; a first slide sheet engaging with the first operation member and displaying the plural function names which selectively appear in the plural function display windows when the first operation member is slidably moved into each of the selected positions; a second operation member disposed adjacent to the first operation member and made slidably movable into a plurality of selected positions; and a second slide sheet engaging with the second operation member, disposed over the first slide sheet and having plural function names selectively appearing in the plural function display windows when the second operation member is slidably moved into each of tile selected position, and also having transparent portion for displaying the functions names of the first slide sheet from the function display windows when the second operation member is selected to one of the plural selected positions.

According to another aspect of the present invention, there is provided a function selecting operation panel, as set forth in the first aspect, wherein the first operation member and the second operation member are disposed so close to each other that they can move in parallel with each other, wherein the first operation member has a plurality of retained portions at its sides at the second operation member, wherein the body has a hook for retaining the plural retained portions elastically, and wherein the second operation member has such a notch in its side at the first operation member as can allow the hook to be released from the retained portions only when the transparent portions of the second slide sheet are aligned with the function display windows.

According to still another aspect of the present invention there is provided a function selecting operation panel, as set forth in the first aspect, wherein the first operation member and the second operation member individually have projections protruded downward, and wherein the body has a plurality of grooved cams, which are made deformable across the moving directions of the projections for fitting the projections therein, and a plurality of switches to be turned ON/OFF by tile movements of the grooved cams.

As described above, according to the present invention, the two slide sheets are so arranged one on the other on the back of the operation panel cover as to slide independently of each other. The slide sheet (i.e., the upper slide sheet) immediately on the back of the operation panel cover is formed with the indicators indicating the function names in letters or symbols, and the transparent portions. When this upper slide sheet is in its predetermined slide position, the transparent portions are positioned to face all the display windows of the operation panel cover. On the other hand, the lower slide sheet is formed with the display portions for displaying tile function names. When the upper slide sheet is slid, one of the plural function names formed in the slide sheet appears in the corresponding one of the display windows of the operation panel cover in accordance with the slide position. On the other hand, when the transparent portions of the upper slide sheet are moved to face the individual display windows, the function names formed in the lower slide sheet appear in the display windows through the transparent portions of the upper slide sheet in accordance with the slide position. Moreover, the selection of the functions by 10 that panel is executed by the ON/OFF statuses of the plural micro-switches based upon the slide positions of those two slide sheets and by the selective pushes of the push button switches at the side of the operation panel cover display windows.

BRIEF DESCRIPTION OF THE DRAWINGS

FIGS. 6(a) and 6(b) are front elevations showing first and second operation members in the function selecting operation panel.

DESCRIPTION OF THE PREFERRED EMBODIMENT

Figure 1:
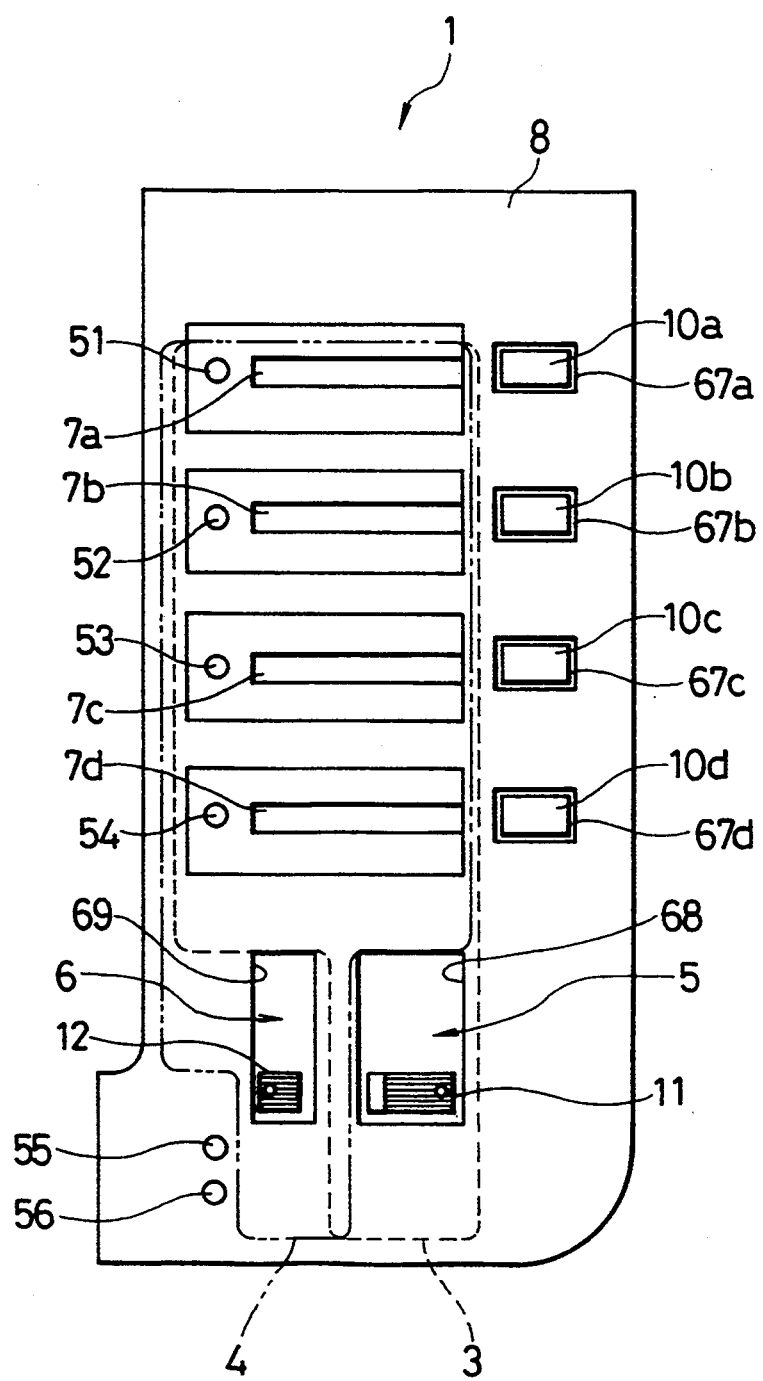
FIG. 1 is a front elevation showing a function selecting operation panel according to an embodiment of the present invention.
Figure 2:
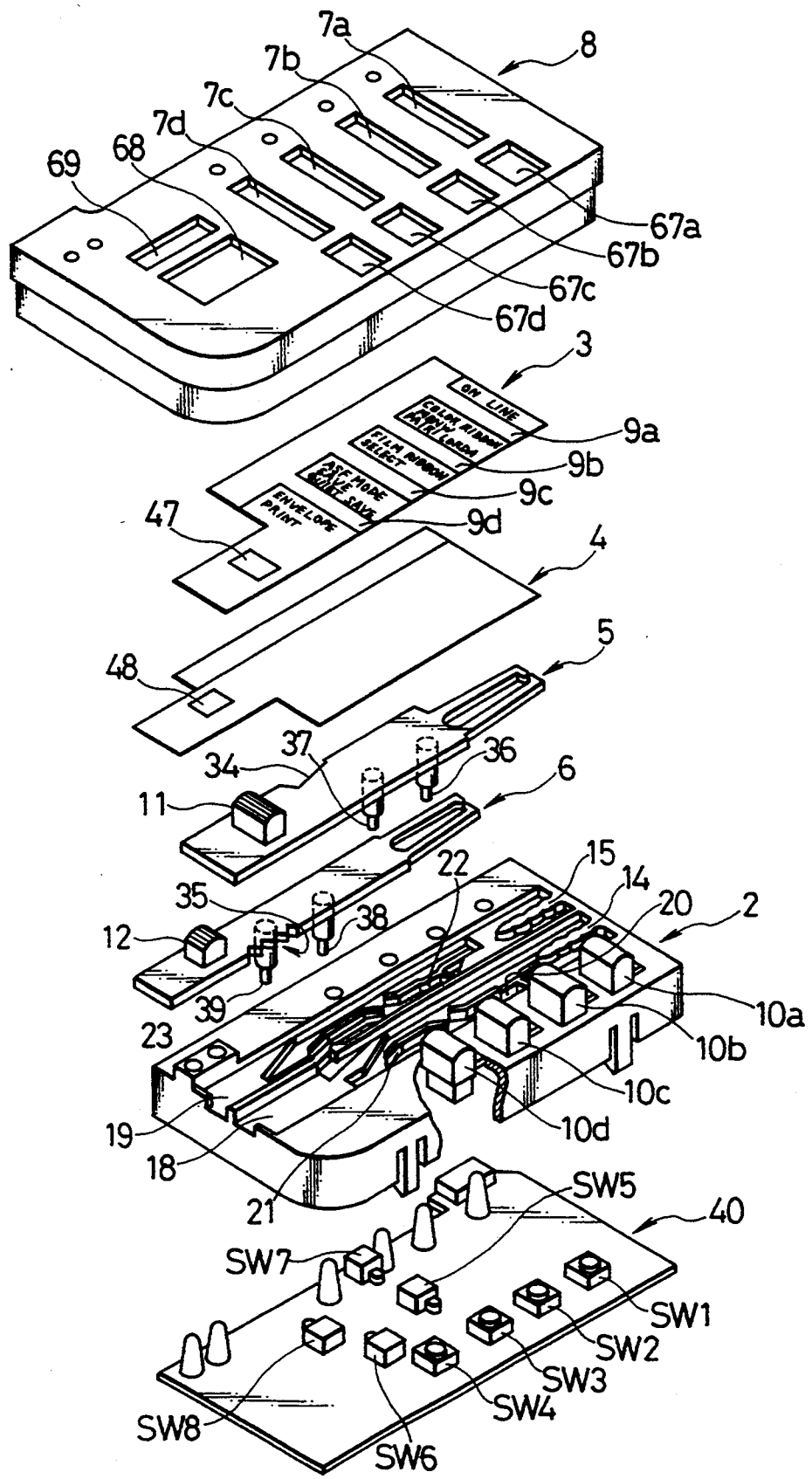
FIG. 2 is an exploded perspective view showing the function selecting operation panel.

FIG. 1 is a front elevation showing an external view of a function selecting operation panel according to the present invention, and FIG. 2 is an exploded perspective view showing the function selecting operation panel. This function selecting operation panel 1 is constructed to include: an operation panel body 2; an operation panel cover 8 covering the operation panel body 2; two slide sheets 3 and 4 each marked with function names and overlapped one on the other; and operation members 5 and 6 fitted in the operation panel body 2 and carrying the slide sheets 3 and 4 longitudinally and independently of each other.

Next, the individual portions will be described in the following with reference to FIGS. 1 to 13.

Figure 3:
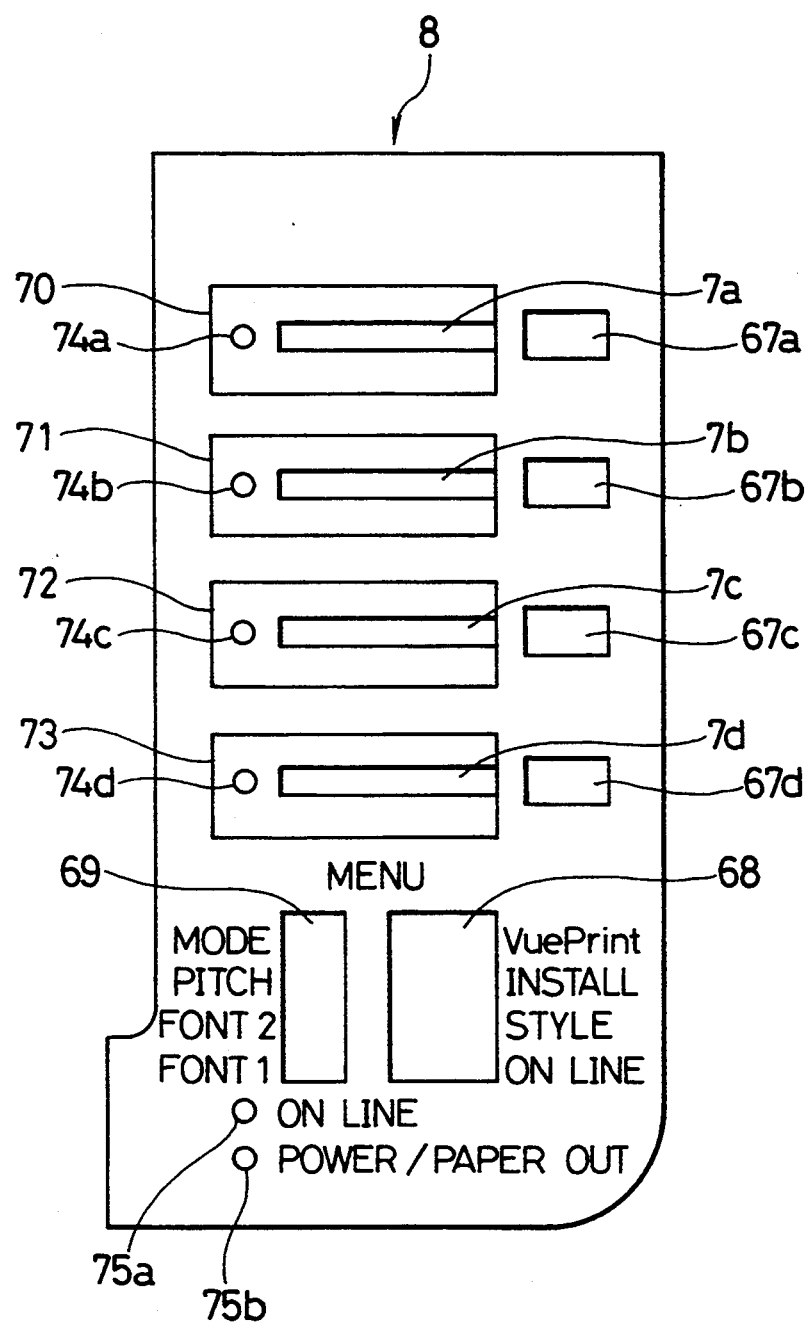
FIG. 3 is a front elevation showing an operation panel cover in the function selecting operation panel.

The operation panel cover 8 is formed along one side of its upper face with four apertures 67a to 67d, as shown in FIGS. 1 to 3, in which are individually arranged push buttons 10a to 10d for selecting control operations, as will be described hereinafter. The operation panel cover 8 is further formed in its upper face with recessed operation function displays 70 to 73 which are located at the individual sides of the four apertures 67a to 67d. The operation function displays 70 to 73 are formed with function display windows 7a to 7d for visually confirming the operation functions written in the slide sheets 3 and 4 therethrough. At the sides of the function display windows 7a to 7d, there are disposed indicators 74a to 74d for indicating the selected statuses of the operation functions appearing in the function display windows 7a to 7d.

Below the operation function displays 70 to 73, there are further formed with apertures 68 and 69 which are juxtaposed to each other. In this aperture 68, there is arranged the operation member 5 which moves longitudinally of the upper slide sheet 3 while having its operation knob 11 protruded from the aperture 68. In the aperture 69, on the other hand, there is arranged the operation member 6 which moves longitudinally of the operation member 6 while having its operation knob 12 protruded from the aperture 69.

Moreover, the operation panel cover 8 is written on its upper face at one side of the apertures 68 and 69 with the individual operation function menus which are selected by the longitudinal movements of the operation members 5 and 6.

On the other hand, the operation panel cover 8 is equipped on its upper face closer to the lower side with indicators 75a and 75b for partially indicating the running status of a printer apparatus on which is mounted the function selecting operation panel 1.

Figure 4:
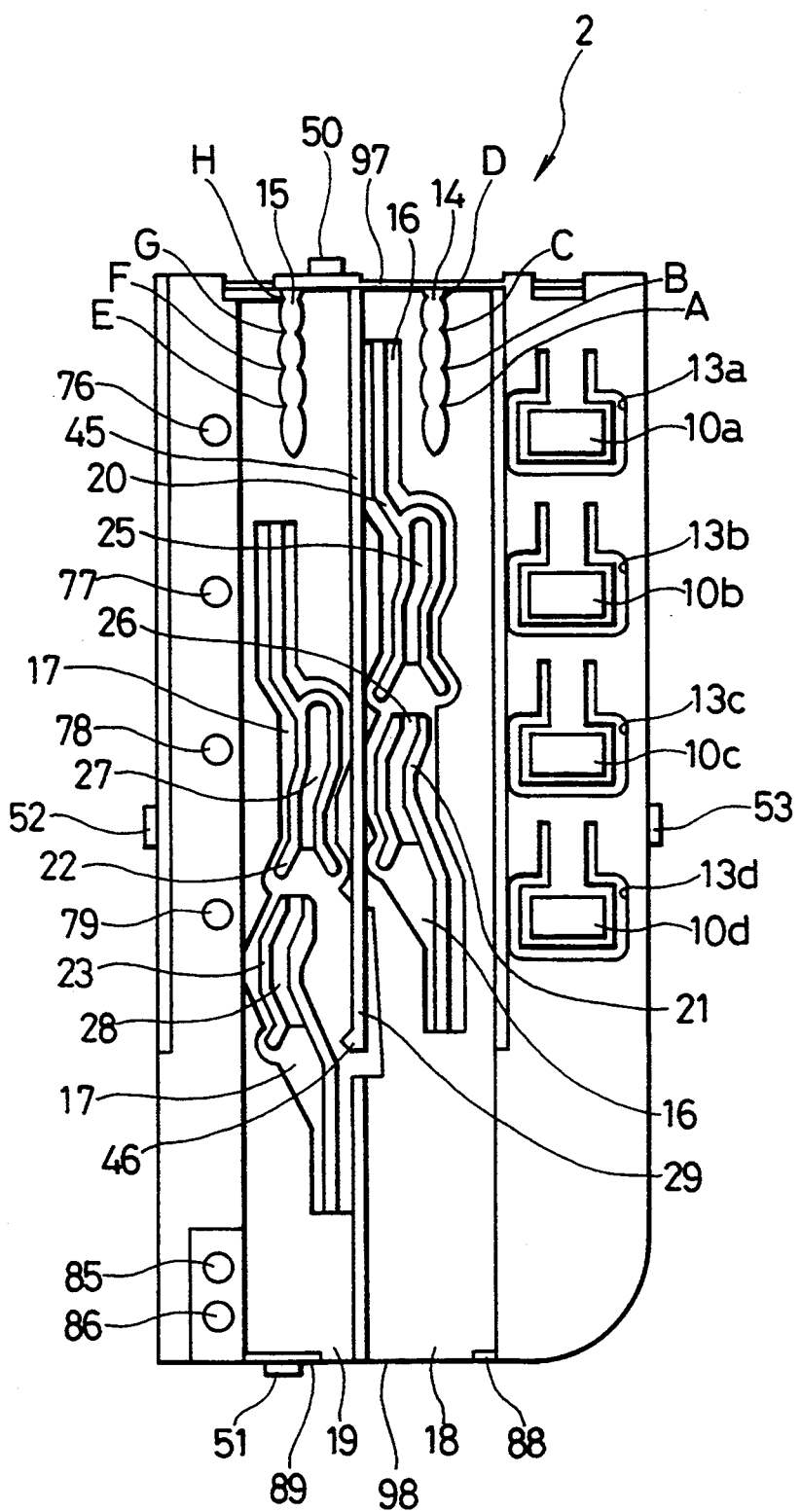
FIG. 4 is a front elevation showing the operation panel cover in the function selecting operation panel.
Figure 5:
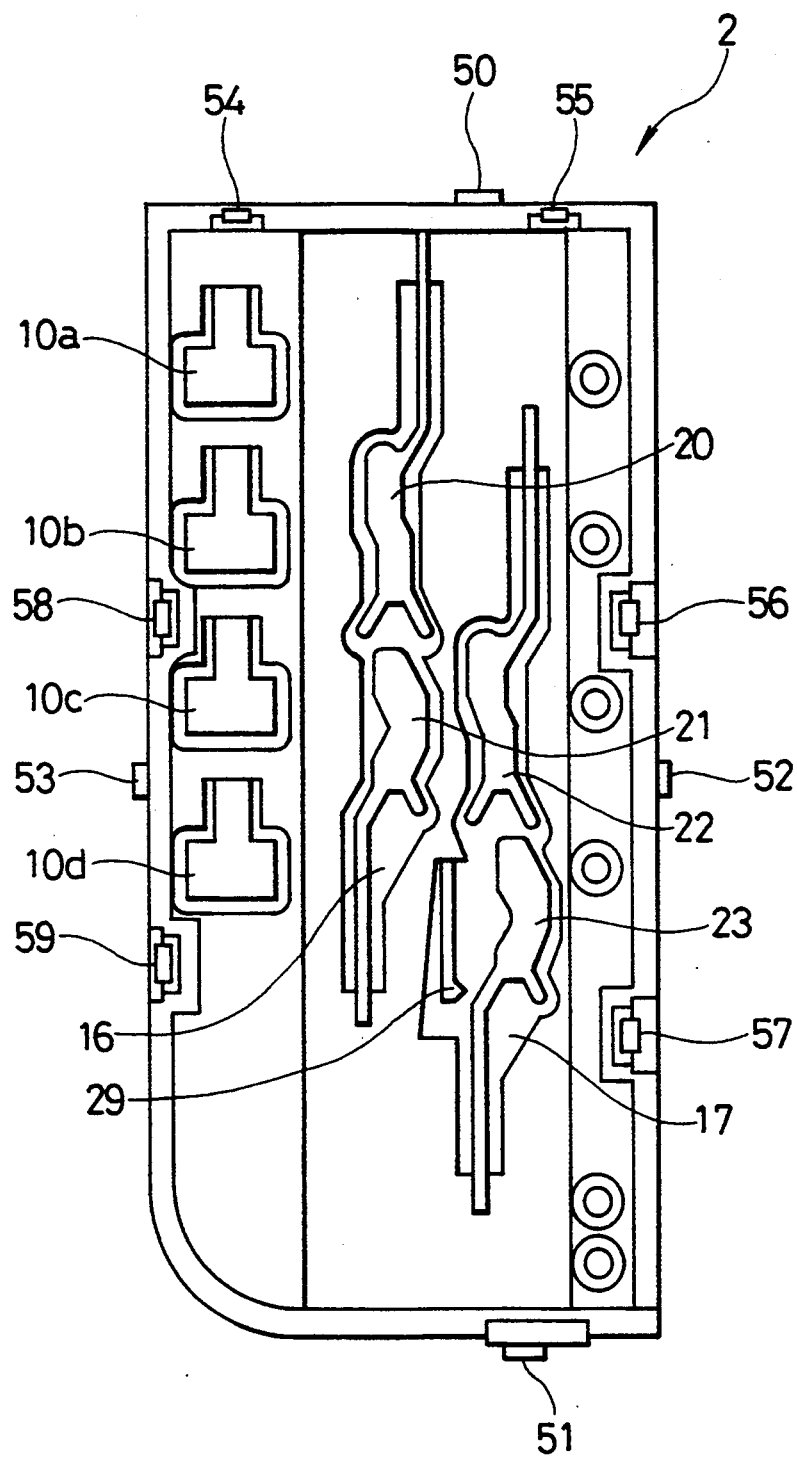
FIG. 5 is a back view of the operation panel body.

FIG. 4 is a front elevation showing the operation panel body 2, and FIG. 5 is a back view of the operation panel body 2 having its switch board 40 removed. This operation panel body 2 excepting the switch board 40 is integrally molded of a synthetic resin or the like in its entirety. In the following description, the upper portion of FIG. 4 will be termed as the front whereas the lower portion will be termed as the back.

At one side of the front of the operation panel body 2, i.e., in the positions corresponding to the apertures 67a to 67d of the operation panel cover 8, there are disposed the push buttons 10a to 10d for push switches SW1 to SW4, which are protruded to the front. The push buttons 10a to 10d individually have their bases formed integrally with the operation panel body 2 and their peripheries spaced from the operation panel body 2 by grooves 13a to 13d formed in the operation panel body 2. When the push buttons 10a to 10d are individually pushed from the front to the back of the front face of the operation panel body 2, they are deformed on their bases so that they can be pushed.

At the side of the individual push buttons 10a to 10d, that is, in positions corresponding to the individual operation function displays 70 to 73 of the operation panel cover 8, there are formed: a recess 18 for fitting the operation member 5 to carry the slide sheet 3 longitudinally; and a recess 19 for fitting the operation member 6 to carry the slide sheet 4 longitudinally.

These recesses 18 and 19 have their front ends extended to the front end 97 of the operation panel body 2 and their rear ends extended to the rear end 98 of the operation panel body 2. At the front end 97 at the recess 18, there is erected from the bottom of the recess 18 a retaining portion 14 which is formed alternately with wider and narrower portions for retaining the operation member 5. At the front end 97 at the recess 19, there is also erected from the bottom of the recess 19 a retaining portion 15 which is given the same shape as that of the retaining portion 14 to retain the operation member 6. These retaining portions 14 and 15 are individually formed with four narrower portions for retaining the operation members 5 and 6, respectively. These individually four retaining positions will be designated sequentially from the rear end 48 to the front end 47 as the retaining positions A, B, C and D for the operation member 5 and as the retaining positions E, F, G and H for the operation member 6.

Incidentally, the rear end 48 of the operation panel body 2 is equipped with a stopper 88 at the side of the recess 18 and a stopper 89 at the side of the recess 19.

Between the recess 18 and the recess 19, on the other hand, there is disposed up to midway from the front end a side plate 45 partitioning the two recesses 18 and 19. This side plate 45 has its rear end equipped elastically with a hook 29 which has a retaining claw 46 directed toward the recess 19 to fit the operation member 6 therein.

The recess 18 is formed with an aperture 16 which is extended forward generally from its center, and the recess 19 is formed with an aperture 17 which is extended back and forth generally from its center. This aperture 17 extends from midway of the side plate 45 to the periphery of the hook 29 at the leading end so that the hook 29 is allowed to move to the right and left across the longitudinal direction.

On the other hand, the operation panel body 2 is formed on its back with four grooved cams 20, 21, 22 and 23 which are extended from the back while having their bases anchored at the operation panel body 2. These grooved cams 20 to 23 are respectively formed in its front with grooves 25, 26, 27 and 27 which are longitudinally meandered. The grooved cams 20 and 21 are so arranged in the aperture 16 formed in the recess 18 that they are transversely spaced from the side walls of the aperture 16. On the other hand, the grooved cams 22 and 23 are so arranged in the aperture 17 formed in the recess 19 that they are transversely spaced from the side walls of the aperture 17. As a result, the individual grooved cams 20 to 23 can move to the right and left across the longitudinal direction of the operation panel body 2.

The groove 25 of the grooved cam 20 is extended at first straight forward and then bent to the right. The groove 26 of the grooved cam 21 is bent to the left, extended straight forward and then bent to the right. The groove 27 of the grooved cam 22 is directed and shaped like the groove 25 of the grooved cam 20, and the groove 28 of the grooved cam 23 is directed and shaped like the groove 26 of the grooved cam 21. In the grooved cams 20 to 23 thus formed, there are respectively fitted in the cams 25 to 28 the column-shaped projections 36 and 37, and 38 and 39, the paired ones of which are respectively formed on the later-described operation members 5 and 6. As a result, the grooved cams 20 to 23 are moved to the right and left, as the column-shaped projections 36 to 39 are guided in the meandered grooves 25 to 28 by the forward and backward movements of the operation members 5 and 6.

In the operation panel body 2 at the side of the recess 19 opposed to the recess 18, that is, in the positions corresponding to the indicators 74a to 74d of the operation panel cover 8 and to the indicators 75a and 75b, there are formed holes 76 to 79 and holes 85 and 86 for visually confirming indication LEDs 60 to 65 which are arranged in the switch board 40 mounted on the back of the operation panel body 2. Moreover, the operation panel body 2 is equipped on its outer sides with retainers 50, 51, 52 and 53 which are projected therefrom for retaining the operation panel cover 8. The operation panel body 2 is further equipped on its back equipped at its front edge and two side edges with retainers 54 and 55 and retainers 56 to 59 for retaining the switch board 40.

FIGS. 6(a) and 6(b) are front elevations showing the operation member 6 and the operation member 5, respectively. The operation member 5 for mounting the slide sheet 3 is made of a thin sheet and is equipped with the operation knob 11 on its front face. The operation member 5 is integrally formed with a pair of clamping portions 30 and 30 having retaining claws 32 and 32 facing each other at their leading ends. The operation member 5 is notched at 34 in its left-hand side, as viewed from the front, for retreat of the hook 29 which is formed at the operation panel body 2. On the other hand, the operation member 6 for mounting the slide sheet 4 is made of a thin sheet and is equipped with the operation knob 12 on its front face.

The operation member 6 is integrally formed, at its front portion, with a pair of clamping portions 31 and 31 having retaining claws 33 and 33 facing each other at their leading ends. The operation member 6 is formed in its right-hand side, as viewed from the front, with four spaced retained portions 35 which are to be retained by the hook 29 which is formed at the operation panel body 2. Hereinafter, the positions for the four retained portions 35 to be retained by the hook 29 will referred to as the retained positions 35a, 35b, 35c and 35d ordered from the front to the back. Moreover, the operation members 5 and 6 are made shorter than the longitudinal length of the recesses 18 and 19 for fitting them.

Figure 7:
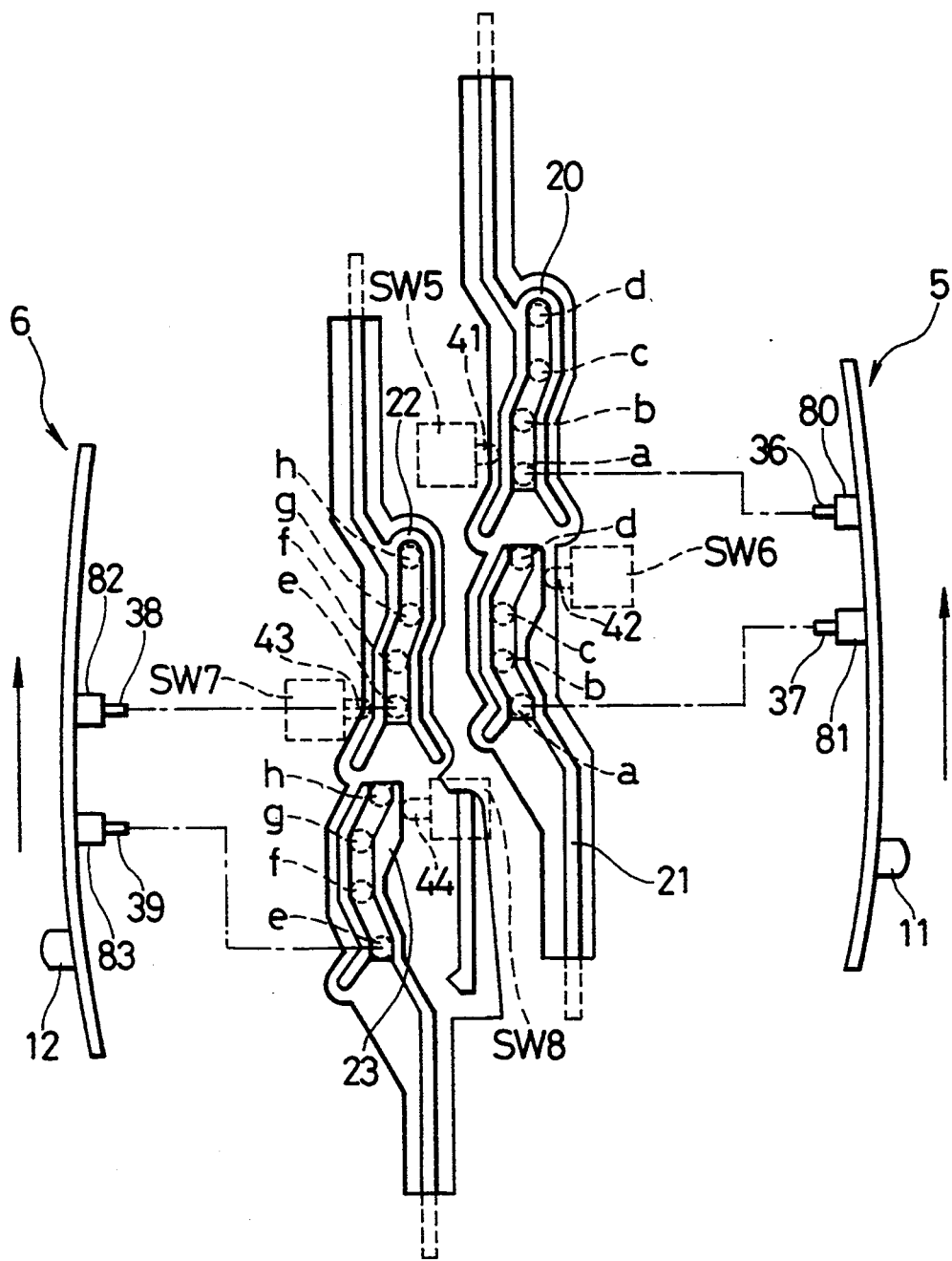
FIG. 7 is a diagram showing the operation principle of the operations of grooved cams and micro switches corresponding to the operations of the first and second operation members.

As could be seen from FIG. 7 presenting the side elevations of the first and second operation members 5 and 6, projections 80 and 81 are formed on the back of the operation member 5, and projections 82 and 83 are formed on the back of the operation member 6. The column-shaped projections 36 to 39 are formed are formed on the respective leading ends of the projections 80 to 83.

Figure 8:
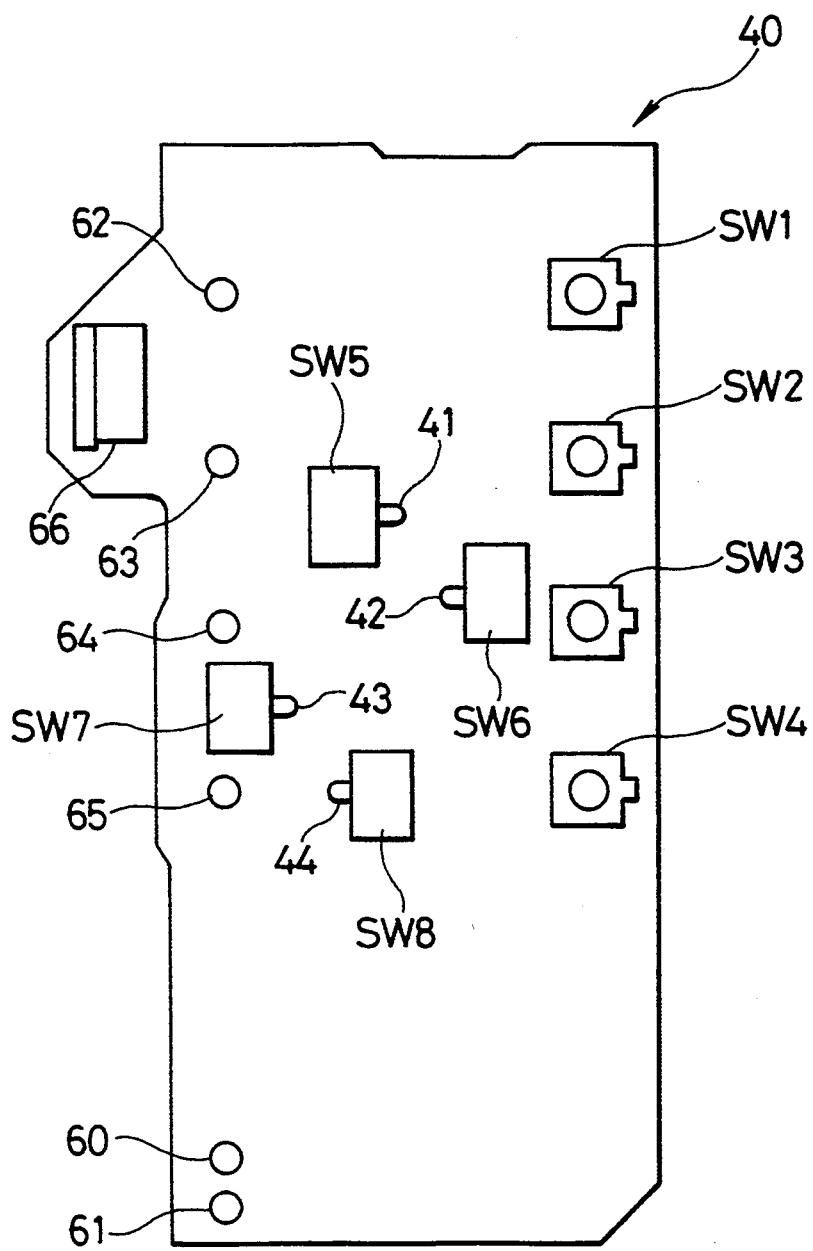
FIG. 8 is a front elevation showing a switch board in the function selecting operation panel.

FIG. 8 is a front elevation showing the switch board 40 which is mounted on the back of the operation panel body 2 while forming a part of the same. The switch board 40 is arranged with the push switches SW1 to SW4 at its one side, that is, in the positions corresponding to the push buttons 10a to 10d of the operation panel body 2. The switch board 40 is further arranged at its central portion with micro-switches SW5 to SW8. The indication LEDs 60 to 65 are individually arranged at the other side of the switch board 40, that is, in the positions corresponding to the indicators 74a to 74d of the operation panel cover 8 and in the positions corresponding to the indicators 75a and 75b. On the other hand, a connector 66 for external connection is arranged at the other side of the switch board 40 closer to the outer end.

As shown in FIG. 7, the micro-switch SW5 has an actuator 41 which is directed to the left-hand side of the grooved cam 20 of the operation panel body 2, and the micro-switch 42 has an actuator 42 which is directed to the right-hand side of the grooved cam 21 of the operation panel body 2. Moreover, the micro-switch SW7 has an actuator 43 which is directed to the left-hand side of the grooved cam 22 of the operation panel body 2, and the micro-switch SW8 has its actuator 44 directed to the right-hand side of the grooved cam 23 of the operation panel body 2.

Figure 9:
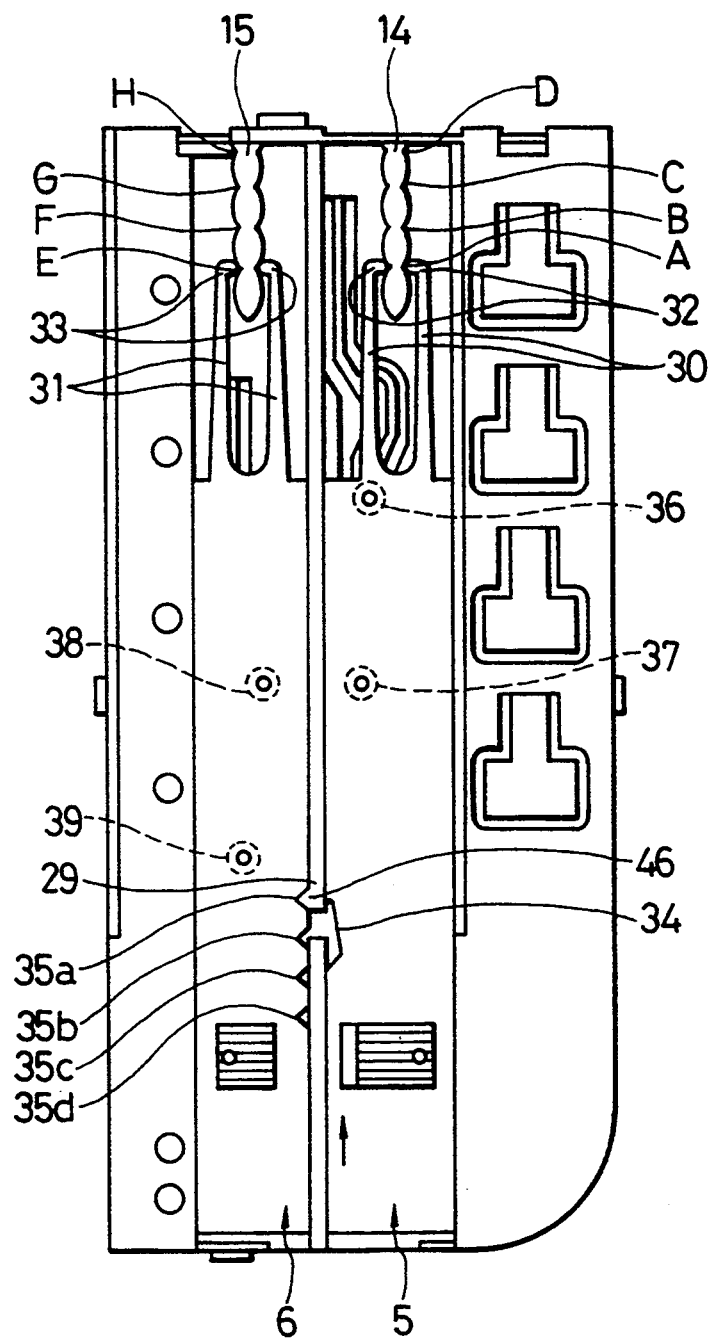
FIG. 9 is a front elevation showing the state in which the operation members are mounted in the operation panel body.

FIG. 9 shows the state in which the operation member 5 and 6 are fitted in the recess 18 and 19 of the operation panel body 2, respectively. The operation member 5 is retained by causing its clamping portions 30 and 30 to clamp the retaining position A of the retaining portion 14 between their retaining claws 32 and 32.

The operation member 6 is retained by causing its clamping portions 31 and 31 to clamp the retained portion E of the retaining portion 15 between their retaining claws 33 and 33. The column-shaped projections 36 and 37 on the back of the operation member 5 are respectively fitted in the groove 25 of the grooved cam 20 and the groove 26 of the grooved cam 21 of the operation panel body 2. Thus, the operation member 5 is located in the rearmost position of the operation panel body 2, i.e., in the position, as designated at "a" in FIG. 7. On the other hand, the column-shaped projections 38 and 39 on the back of the operation member 6 are respectively fitted in the groove 27 of the grooved cam 22 and the groove 28 of the grooved cam 23 of the operation panel body 2. Thus, the operation member 6 is located in the rearmost position of the operation panel body 2, i.e., in the position as designated at "e" in FIG. 7.

Incidentally, the clamping force to clamp the clamping portions 30 and 30 of the operation member 5 in the individual retaining positions of the retaining portion 14 and the clamping force to clamp the clamping portions 31 and 31 of the operation member in the individual retaining positions of the retaining portion 15 are set to allow the operation members 5 and 6 to move back and forth.

Moreover, the hook 29 of the operation panel body 2 is so interposed between the operation members 5 and 6 as to have its retaining claw 46 engaging with the foremost position 35a of the retained portion 35 of the operation member 6. The notch 34 of the operation member 5 is so positioned below the hook 29 as to prevent the retreat of the hook 29 into the notch 34.

Furthermore, the grooved cam 20 and the grooved cam 21 are in their original positions so that both the micro-switches SW5 and SW6 are in OFF state.

Here will be described the operations of the 10 grooved cams 20 and 21, when the operation member 5 is moved forward, as well as the ON/OFF statuses of the micro-switches SW5 and SW6.

First of all, when the operation member 5 is moved forward, i.e., in the direction, as indicated by solid arrows in FIGS. 7 and 9, its clamping portions 30 and 30 have their retaining claws 32 and 32 released from the retaining position A of the retaining portion 14 so that the operation member 5 is moved forward while being guided by the both sides of the recess 18. When the retaining claws 32 and 32 of the clamping portions 30 and 30 come into the retaining position B formed in front of the retaining position A of the retaining portion 14, they clamp the retaining position B between them so that the operation member 5 is halted in the retaining position B.

When the operation member 5 is thus moved forward, the column-shaped projections 36 and 37 on its back are moved straight forward while being respectively fitted in the groove 25 of the grooved cam 20 and the groove 26 of the grooved cam 21 of the operation panel body 2.

Since the column-shaped projection 36 passes through the forward straight portion of the groove 25 of the grooved cam 20, this cam 20 is left in its original position, and the micro-switch SW5 is still in OFF state. In this meanwhile, however, the column-shaped projection 37 passes through the leftward bent portion of the groove 26 of the grooved cam 21. As a result, the column-shaped projection 37 pushes the righthand side of the groove 26, as it passes therethrough, to shift the grooved cam 21 rightward of FIG. 7. In accordance with this shift, the micro-switch SW6 is turned ON because its actuator 42 is directed to the righthand side of the grooved cam 21 of the operation panel body 2. In short, the column-shaped projections 36 and 37 are moved from the positions "a" to the positions "b" of the grooves 25 and 26, as shown in FIG. 7.

Figure 10:
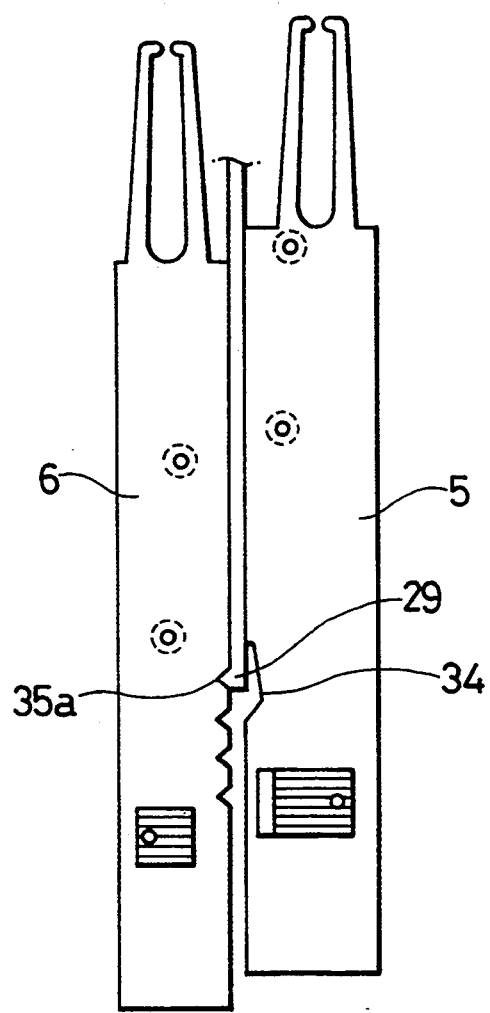
FIG. 10 is a front elevation showing an example of the engaging relations among the retained portions, notch and hook formed in the operation members.

Moreover, the position of the notch 34 of the operation member 5 in the retaining position B of the operation member 5 comes into alignment with the position of the hook 29, as shown in FIG. 10, so that the hook 29 can retreat into the notch 34.

Likewise, the operation member 5 is further moved forward over the retaining position B until it is halted in the retaining position C.

Since the column-shaped projection 36 passes through the rightward bent portion of the groove 25 of the grooved cam 20, it pushes the left-hand side of the groove 25, as it moves straight, to shift the grooved cam 20 to the left. In accordance with this shift, the micro-switch SW5 is turned ON because its actuator 41 is directed to the left-hand side of the grooved cam 20.

On the other hand, since the column-shaped projection 37 passes through the straight portion of the groove 26 of the grooved cam 21, this cam 21 is left in its operating position, and the micro-switch SW5 is still in ON state. In short, the column-shaped projections 36 and 37 are individually moved from the positions of the grooves 25 and 26, as designated at "b" in FIG. 7, to the positions, as designated at "c".

At this time, the notch 34 of the operation member 5 is shifted to the upper position of the hook 29 so that the hook 29 is prohibited from retreating into the notch 34.

Moreover, the operation member 5 is moved forward from the retaining position C until it is halted at the retaining position D.

Since the column-shaped projection 36 of the operation member 5 passes through the straight forward portion of the groove 25 of the grooved cam 20, this cam 20 is left in its operating position, and the micro-switch SW5 is still in ON state. On the other hand, the column-shaped projection 37 of the operation member 5 passes through the rightward bent portion of the groove 26 of the grooved cam 21. As a result, the columnshaped projection 37 pushes the left-hand side of the groove 26, as it moves straight, so that the grooved cam 21 is shifted leftward apart from the actuator 42 of the micro-switch SW6 until it restores its original position. As a result, the micro-switch SW6 is turned OFF. In short, the column-shaped projections 36 and 37 are individually moved from the positions of the grooves 25 and 26 as designated at "c" in FIG. 7, to the positions, as designated at "d". On the other hand, the operation member 5 has its notch 34 positioned above the hook 29 so that the hook 29 is prohibited from retreating into the notch 34.

As described above: in the retaining position A of the operation member 5, the micro-switch SW5 is in OFF state, and the micro-switch SW6 is in OFF state; in the retaining position B, the micro-switch SW5 is in OFF state, but the micro-switch SW6 is in ON state; in the retaining position C, the micro-switch SW5 is in ON state and the micro-switch SW6 is in ON state; and in the retaining position D, the micro-switch SW5 is in ON state but the micro-switch SW6 is in OFF state. Thus, the operation member 5 is given the individually different ON/OFF combinations of the two micro-switches SW5 and SW6 in the retaining positions (A to D).

Here will be described the operations of the grooved cams 22 and 23, when the operation member 6 is moved forward, together with the ON/OF statuses of the micro-switch SW7 and the micro-switch SW8.

The longitudinal displacement of the operation member 6 is equal to that of the operation member 5 because the retaining portions 14 and 15 of the two are identically shaped.

Since the operation member 6 is retained by the hook 29 of any of the retaining portions 35 in the retained positions 35a, 35b, 35c and 35d at the side where the operation member 5 is fitted, it is not allowed to move back and forth before the hook 29 can Petteat from the retained portions 35. It is only when the operation member 5 is in the retaining position B that the hook 29 can retreat, as has been described above. In this case, the hook 29 can retreat into the notch 34 of the operation member 5 because the notch 34 is aligned with the position of the hook 29.

if the operation member 6 is moved forward when the operation member 5 is in the retaining position B, the retaining claws 33 and 33 of the clamping portions 31 and 31 of the operation member 6 leave the retaining position E of the retaining portion 15, and the hook 29 goes out of engagement with the retained position 38a at the side of the operation member 6 and retreat into the notch 34 of the operation member 5. As a result, the operation member 6 is moved forward while being guided by the both sides of the recess 19 formed in the panel body 2, so that the retaining claws 33 and 33 of the clamping portions 31 and 31 of the operation member 6 reach the retaining position F formed in front of the retaining position E of the retaining portion 15. Then, the retaining claws 33 and 33 of the clamping portions 31 and 31 of the operation member 6 clamp the retaining position F between themselves, and the retaining claw 46 at the leading end of the hook 29 comes into engagement with the retained position 35b at the back of the retained position 35a, so that the operation member 6 is retained.

The groove 27 of the grooved cam 22 is directed and shaped like the groove 25 of the grooved cam 20. Likewise, the groove 28 of the grooved cam 23 is directed and sized like the groove 26 of the grooved cam 21. The column-shaped projections 38 and 39 on the back of the operation member 6 are moved straight forward while being fitted in the grooves 27 and 28 of the grooved cams 22 and 23 of the operation panel body 2. The relation of arrangement between the micro-switch SW7 and the micro-switch SW8 is similar to that between the micro-switch SW5 and the micro-switch SW6, whose functions are described above with reference to the operation menbet 5. As a result, the ON/OFF state of the micro-switch SW7 and the micro-switch SW8 corresponding to the actions of the grooved cams 22 and 23 accompanying the longitudinal movements of the operation member 6 and to the retained position of the operation member 6 are identical to those of the aforementioned microswitch SW5 and micro-switch SW6.

Specifically, in the retaining position E of the operation member 6, the micro-switch SW7 is in OFF state, and the micro-switch SW8 are in OFF state. In the retaining position F, the micro-switch SW7 is in OFF state, but the micro-switch SW8 is in ON state. In the retaining position G, the micro-switch SW7 is in ON state, and the micro-switch SW8 is in ON state. In the retaining position H, the micro-switch SW7 is in ON state, but the micro-switch SW8 is in OFF state. Thus, the operation member 6 is given like the operation member 5 the individually different ON/OFF combinations of the two micro-switches SW7 and SW8 in the retaining positions (E to H).

Here will be described the slide sheet 3 in the following.

Figure 11:
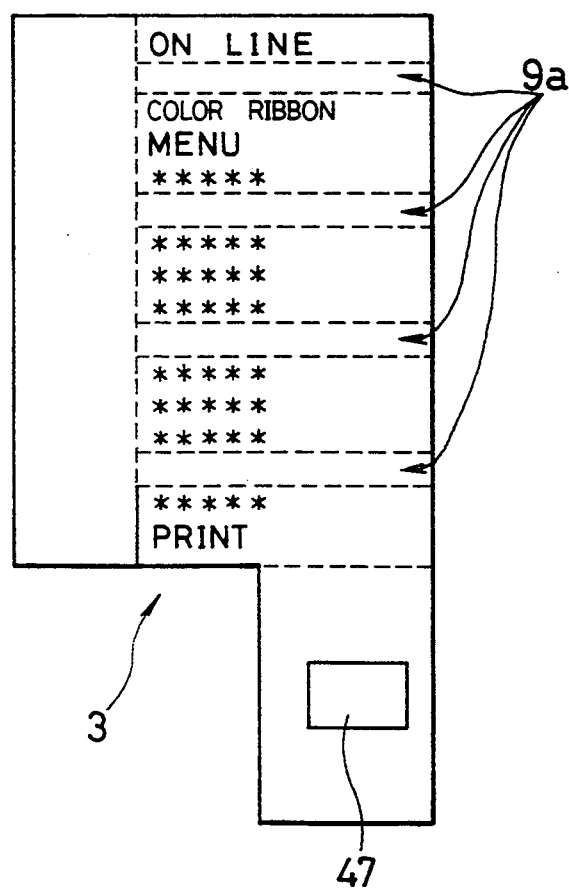
FIG. 11 is a front elevation showing an upper slide sheet in the function selecting operation panel.

As shown in FIG. 11, the slide sheet 3 is formed at its longitudinal rear portion of its movement with the aperture 47, through which is inserted the operation knob 11 of the operation member 5. The slide sheet 3 is written, in the part extending from its midway to front, with the function names (each being written in lateral line ). They are longitudinally arrayed in the slide sheet 3 in the positions corresponding to the function display windows 7a to 7d of the operation panel cover 8. The slide sheet 3 is further equipped with four transparent portions 9a to 9d which are left unwritten. Moreover, the display of one function name and one of the transparent portions 9a to 9d are made as longitudinally wide as the movement of the operation member 5 from one to next retained positions. The transparent portion 9a is arranged at the second position from the front, and the transparent portions 9b, 9c and 9d are at every other three function displays from that transparent portion 9a. In the present embodiment, there are arranged "ON LINE", the transparent portion 9a, "COLOR RIBBON" and so on.

Figure 12:
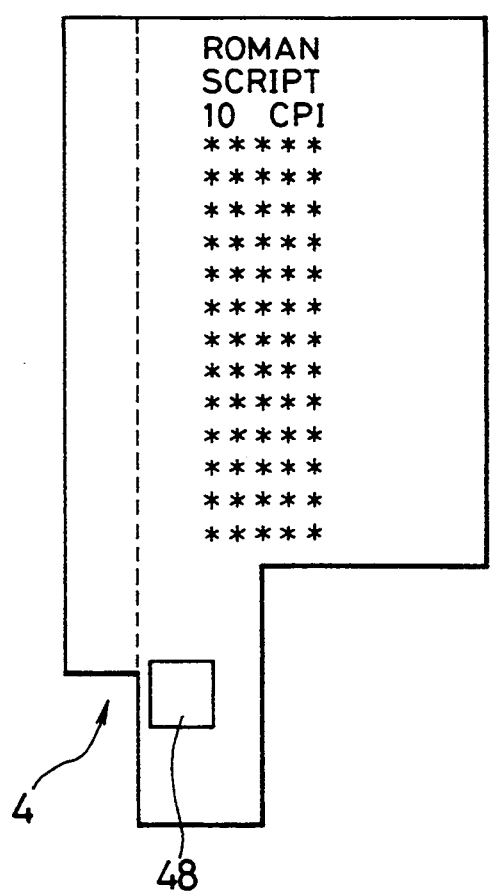
FIG. 12 is a front elevation showing a lower slide sheet of the same.

As shown in FIG. 12, on the other hand, the slide sheet 4 is formed at its longitudinally rear portion of its movement with the aperture 48, through which is inserted the operation knob 12 of the operation member 6. The slide sheet 4 is written, in the part extending from its midway to front, with the function names (each being written in lateral line ). They are longitudinally arrayed in the slide sheet 4 in the positions corresponding to the function display windows 7a to 7d of the operation panel cover 8. Moreover, the longitudinal width of the display of one function name of the slide sheet 4 is made equal to the movement of the operation member 6 from one to next retained positions and also made equal to the longitudinal width of display of each function name of the slide sheet 3 as well as that of the transparent portions 9a to 9d of the slide sheet 3. In the present embodiment, there are arranged "ROMAN", "SCRIPT", "10 CPI" and so on in order from the longitudinal front.

The slide sheets 3 and 4 are mounted on the operation panel body 2 in the following manner. The slide sheet 3 is superposed over the slide sheet 4 such that after the slide sheet 4 is placed to receive the operation knob 12 of the operation member 6 fitted in the operation panel body 2 by its aperture 48, the slide sheet 3 is then placed to receive the operation knob 11 of the operation member 5 fitted in the operation panel body 2 by its aperture 47. At this time, every three function displays on the lower slide sheet 4 are visually confirmed from the transparent portions 9a to 9d formed in the upper slide sheet 3. After the slide sheet 3 and the slide sheet 4 have been mounted, the operation panel cover 8 is retained on the retaining portions 50, 51, 52 and 53 which are formed on the outer sides of the operation panel body 2.

The function names written on the upper slide sheet 3 are displaced in the function display windows 7a to 7d of the operation panel cover 8. Here, the longitudinal gaps between the function display windows 7a to 7d correspond to the width of the three function names written on the individual slide sheets 3 and 4. When the operation member 5 is moved to the longitudinally rearmost position, i.e., to the aforementioned retaining position A, the foremost function name "ON-LINE" of the slide sheet 3 appears in the function display window 7a.

Figure 13:
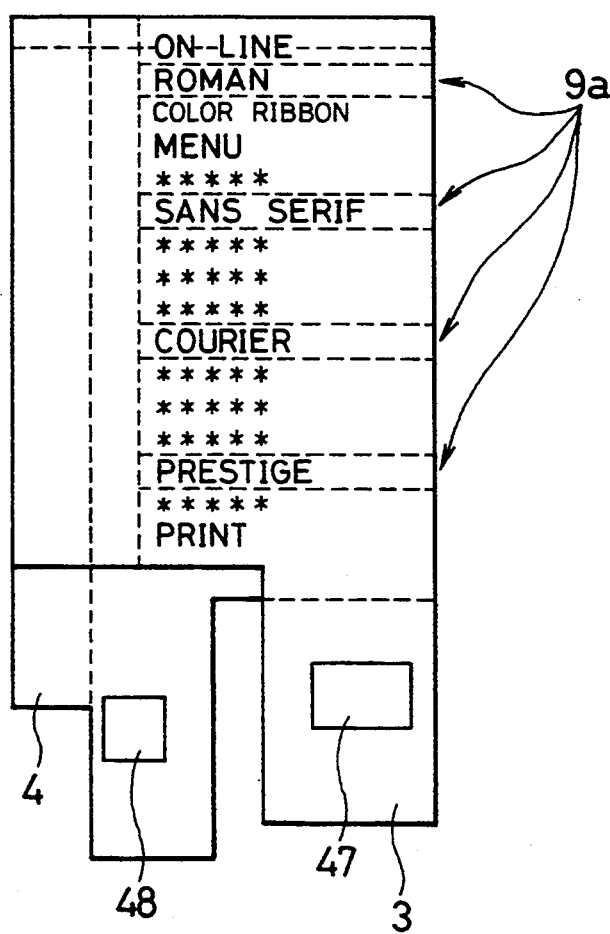
FIG. 13 is a front elevation showing the state in which the upper slide sheet is superposed on the lower slide sheet.

When the operation knob 11 is actuated to bring the operation member 5 forward to a next retaining position, i.e., the aforementioned retaining position B, the transparent portions 9a to 9d of the upper slide sheet 3 appear in the function display windows 7a to 7d of the operation panel cover 8, respectively, because the longitudinal width of each function name display corresponds to the staged movements of the operation member 5. In other words, the transparent portions 9a to 9d of the upper slide sheet 3 come into alignment with the function display windows 7a to 7d so that the function names written on the lower slide sheet 4 ape visually confirmed through the function display windows 7a to 7d. Since the operation member 5 is in the retaining position B, the hook 29 can retreat into the notch 34 of the operation member 5 so that the operation member 6 can be moved back and forth. In case a function name written on the lower slide sheet 4 is to be selected, the operation member 5 is moved to the position in which the function display windows 7a to 7d are aligned with the transparent portions 9a to 9d of the upper slide sheet 3. FIG. 13 shows the state in which the upper slide sheet is superposed on the lower slide sheet.

When the operation member 6 is brought to the longitudinally rearmost position, i.e., the aforementioned retaining position E, the foremost function name "ROMAN" written on the slide sheet 4 appears in the function display window 7a. When the operation knob 12 is actuated to bring the operation member 6 forward to a next retaining position, i.e., the aforementioned retaining position F, the next foremost function name "SCRIPT" of the slide sheet 4 appears in the function display window 7a because tile longitudinal width of the function name display corresponds to the staged movement of tile operation member 6.

When the operation knob 11 is further actuated to bring the operation member 5 forward from the retaining position B to the retaining position C, the function name (e.g., the "COLOR RIBBON" in the example of FIG. 11) of the upper slide sheet 3 appears again in the function display windows 7a to 7d of tile operation panel cover 8.

The function name to be selected is selected from the function names appearing in the individual function display windows 7a to 7d, and any of the push buttons 10a to 10d at the side of the function display window, in which that particular function name appears, is pushed. Then, that one of the push switches SW1 to SW4 of the switch board 40, which corresponds to the pushed one of the push buttons 10a to 10d, is turned ON because the push switches SW1 to SW4 are respectively arranged below the push buttons 10a to 10d. On the other hand, the ON/OFF states of the micro-switches SW5 to SW8 are determined in dependence upon the individual retained positions of the operation members 5 and 6, as described before. In case tile function names of the upper slide sheet 3 are positioned to be selected, that is, in case the retained position of the operation member 5 is in any of the retaining positions A, C and D, the selected function is designated in response to the ON/OFF states of tile micro-switches SW5 and SW6 and the ON states of any of the push switches SW1 to SW4. In case the function name of the lower slide sheet 4 is in the selected position, that is, in case the retaining position of the operation member 5 is in the retaining position B, the selected function is designated in response to the OFF state of the micro-switch SW5, the ON status of the micro-switch SW6, the ON/OFF states of the micro-switches SW7 and SW8, and the ON states of any of the push switches SW1 to SW4.

In the present embodiment, the number of operation functions to be selected is twelve for the function names of the upper slide sheet 3 and sixteen for the function names of the lower slide sheet 4 so that totally twenty eight operation functions can be designated. As to one push button, the operation functions to be designated for the upper slide sheet 3 are three corresponding to the retaining positions A, C and D of the operation member 5 and tile operation functions to be designated for the lower slide sheet 4 are four corresponding to the retaining position B of the operation member 5 and the retaining positions E, F, G and H of the operation member 6, so that totally seven operation functions can be designated for one push button. As a result, totally twenty eight operation functions can be designated for the four push buttons 10a to 10d.

As has been described above, the function electing operation panel 1 is constructed to comprise: the operation panel body 2; the operation panel cover 8 mounted on the operation panel body 2 and equipped with the plural function display windows 7a to 7d having the function names and tile push buttons 10a to 10d disposed respectively adjacent to the function display windows 7a to 7d for selecting the function names appearing in the function display windows 7a to 7d; the first operation member interposed between the operation panel cover 8 and the operation panel body 2 and made slidable for displaying the plural selected positions; the lower slide sheet 4 engaging with the operation member 6 for displaying the plural function names, which selectively appear in the plural function display windows 7a to 7d when the operation member 6 is slidably moved into each of the selected positions; the second operation member 5 disposed adjacent to the first operation member 6 and made slidable into the plural selected positions; and the upper slide sheet 3 engaging with the second operation member 5, disposed over the lower slide sheet 4 and having the transparent portions 9a to 9d for displaying both the plural function names, which selectively appear in the function display windows 7a to 7d when the second operation member 6 is slidably moved into each of the selected positions, and the function names of the lower slide sheet 4, which selectively appear in the function display windows 7a to 7d when the second operation member 5 is selected in one of the selected positions. As a result, the operation member 5 corresponding to the upper slide sheet 3 is actuated to move the overlying slide sheet 3 back and forth, and the function names written on the upper slide sheet 3 are visually confirmed through the function display windows 7a to 7d on the upper face of the operation panel cover 8, so that the function names appearing in the function display windows 7a to 7d are selected by the push buttons 10a to 10d disposed in the operation panel body 2. Moreover, the operation member 5 corresponding to the upper slide sheet 3 is actuated to bring the function display windows 7a to 7d on the operation panel cover 8 into alignment with the transparent portions 9a to 9d formed in the upper slide sheet 3. After this, the operation member 6 corresponding to the lower slide sheet 4 is actuated so that the function names written on the lower slide sheet 4 are visually confirmed through the transparent portions 9a to 9d and the function display windows 7a to 7d to select the confirmed function names by the push buttons 10a to 10d. Thus, in the operation panel having the operation functions corresponding one to one to the push buttons 10a to 10d on the function selecting operation panel 1, the number of function menus to be selected in the operation panel can be expanded without any increase in the area of the operation panel.

The operation panel 6 and the operation panel 5 are so disposed in proximity as to move in parallel with each other. The operation member is equipped at the side of the operation member 5 with the plural retained portions 35a to 35d. The operation panel body 2 is equipped with the hook 29 for retaining the plural retained portions 35a to 35d elastically. More-over, the operation member 5 is formed at the side of the operation member 6 with the notch 34 for releasing the hook 29 from the retained portions 35a to 35d only when the transparent portions 9a to 9d of the slide sheet 3 are aligned with the function display windows 7a to 7d. As a result, the operation member 6 is allowed to move only when the lower slide sheet 4 appears in the function display windows 7a to 7d, so that the operation functions written on the upper slide sheet 3 and the operation functions written on the lower slide sheet 4 can be easily prevented from being erroneously used.

Furthermore, the operation member 6 and the operation member 5 are respectively equipped with the column-shaped projections 36 to 39 protruded downward, and the operation panel body 2 is formed with the grooved cams 20 to 23 for fitting the column-shaped projections 36 to 39 therein. These grooved cams 20 to 23 are deformed across the moving direction of the column-shaped projections 36 to 39. The operation panel body 2 is further equipped with the micro-switches SW5 to SW8 which are turned ON and OFF in response to the movements of the grooved cams 20 to 23, so that no serious load is applied to the micro-switches SW5 to SW8. Moreover, the grooved cams 20 to 23 are actuated only by the movements of the operation members 5 and 6 so that no serious influence is exerted from undesired elastic deformation or the dispersion in the deformation of the grooved cams 20 to 23 due to the high temperature or heat insulation.

What is claimed is:

1. A function selecting operation panel comprising:
a body having a plurality of push buttons for selecting a plurality of switches;
an operation panel cover mounted on said body and having a plurality of function display windows and a plurality of push button apertures formed adjacent to said plurality of function display windows for selecting first function names appearing in said plurality of function display windows;
a first operation member made slidably movable into a first plurality of selected positions between said operation panel cover and said body;
a first slide sheet engaging with said first operation member and displaying the first function names which selectively appear in said plurality of function display windows when said first operation member is slidably moved into each of said first plurality of selected positions;
a second operation member disposed adjacent to said first operation member and made slidably movable into a second plurality of selected positions; and
a second slide sheet engaging with said second operation member, disposed over said first slide sheet and having second function names selectively appearing in said plurality of function display windows when said second operation member is slidably moved into each of said second plurality of selected positions, and also having transparent portions displaying the first function names of said first slide sheet in said plurality of function display windows when said second operation member is selected to one of said second plurality of selected positions.

2. A function selecting operation panel according to claim 1,
wherein said first slide sheet includes a first aperture, and said first operation member includes a first knob, and said second slide sheet includes a second aperture, and said second operation member includes a second knob, and
wherein said first knob is inserted in said first aperture and said first operation member independently controls said first slide sheet responsive to said first knob, and said second knob is inserted in said second aperture and said second operation member independently controls said second slide sheet responsive to said second knob.

3. A function selecting operation panel according to claim 1,
wherein said first slide sheet includes four operation functions, and said second slide sheet includes three operation functions, and
wherein said first and second slide sheets provide a total of seven operation functions for each of the push buttons.

4. A function selecting operation panel according to claim 1,
wherein said first slide sheet includes a first number of operation functions, and said second slide sheet includes a second number of operation functions, and
wherein said first and second slide sheets provide a total of the first number of operation functions added to the second number of operation functions for each of the push buttons.

5. A function selecting operation panel comprising:
a body having a plurality of push buttons for selecting plurality of switches;
an operation panel cover mounted on said body and having a plurality of function display windows and a plurality of push button apertures formed adjacent to said plurality of function display windows for selecting first function names appearing in said plurality of function display windows;
a first operation member made slidably movable into a first plurality of selected positions between said operation panel cover and said body;
a first slide sheet engaging with said first operation member and displaying the first function names which selectively appear in said plurality of function display windows when said first operation member is slidably moved into each of said first plurality of selected positions;.
a second operation member disposed adjacent to said first operation member and made slidably movable into a second plurality of selected positions; and
a second slide sheet engaging with said second operation member, disposed over said first slide sheet and having second function names selectively appearing in said plurality of function display windows when said second operation member is slidably moved into each of said second plurality of selected positions, and also having transparent portions displaying the first function names of said first slide sheet in said plurality of function display windows when said second operation member is selected to one of said second plurality of selected positions, wherein said first operation member and said second operation member move in parallel with each other, said first operation member has a plurality of retained portions on a first side, said body has a hook for engaging said plurality of retained portions and elastically retaining said plurality of retained portions, and said second operation member has a notch facing said plurality of retained portions on the first side of said first operation member as to allow said hook to be released from said plurality of retained portions only when the transparent portions of said second slide sheet are aligned with said plurality of function display windows.

6. A function selecting operation panel comprising:

a body having a plurality of push buttons for selecting a plurality of switches;

an operation panel cover mounted on said body and having a plurality of function display windows and a plurality of push button apertures formed adjacent to said plurality of function display windows for selecting first function names appearing in said plurality of function display windows;

a first operation member made slidably movable into a first plurality of selected positions between said operation panel cover and said body;

a first slide sheet engaging with said first operation member and displaying the first function names which selectively appear in said plurality of function display windows when said first operation member is slidably moved into each of said first plurality of selected positions;

a second operation member disposed adjacent to said first operation member and made slidably movable into a second plurality of selected positions; and a second slide sheet engaging with said second operation member, disposed over said first slide sheet and having second function names selectively appearing in said plurality of function display windows when said second operation member is slidably moved into each of said second plurality of selected positions, and also having transparent portions displaying the first function names of said first slide sheet in said plurality of function display windows when said second operation member is selected to one of said second plurality of selected positions, wherein said first operation member and said second operation member individually have projections protruding downward, and said body has a plurality of grooved cams, which are made deformable across the moving directions of said projections for fitting said projections therein, and a plurality of switches to be turned ON/OFF by the movements of said plurality of grooved cams.

7. A function selecting operation panel comprising:

a body having a plurality of push buttons for turning ON and OFF a plurality of switches, respectively;

an operation panel cover having a plurality of apertures for protruding said plurality of push buttons, respectively, and a plurality of display windows formed in positions corresponding to the respective positions of said plurality of apertures;

a lower first slide sheet and an upper second slide sheet placed on the back of said operation panel cover, said upper second slide sheet being positioned immediately on the back of said operation panel cover and said lower first slide sheet being positioned beneath said upper second slide sheet;

first and second operation members for causing said lower first and upper second slide sheet to stepwise slide independently of each other along the direction of arrangement of said plurality of display windows formed in said operation panel cover; and a plurality of micro-switches to be turned ON and OFF in response to the individual slides of said first and second operation members;

wherein said lower first slide sheet is formed with letter or symbol indicators which are positioned to correspond to said plurality of display windows, respectively, in a plurality of slide positions, and said upper second slide sheet is formed with transparent portions in the positions corresponding to said plurality of display windows, respectively, in predetermined ones of said plurality of slide positions, and the letter or symbol indicators are positioned to correspond to said plurality of display windows in remaining plural slide positions.

8. A function selecting operation panel according to claim 7, wherein said lower first slide sheet includes a first aperture, and said first operation member includes a first knob, and said upper second slide sheet includes a second aperture, and said second operation member includes a second knob, and wherein said first knob is inserted in said first aperture and said first operation member independently controls said lower first slide sheet responsive to said first knob, and said second knob is inserted in said second aperture and said second operation member independently controls said upper second slide sheet responsive to said second knob.

9. A function selecting operation panel according to claim 7, wherein said lower first slide sheet includes four operation functions, and said upper second slide sheet includes three operation functions, and wherein said first and upper second slide sheets provide a total of seven operation functions for each of the push buttons.

10. A function selecting operation panel according to claim 7, wherein said lower first slide sheet includes a first number of operation functions, and said upper second slide sheet includes a second number of operation functions, and wherein said first and upper second slide sheets provide a total of the first number of operation functions added to the second number of operation functions for each of the push buttons.

* * * * *